United States Patent Office
3,410,840
Patented Nov. 12, 1968

3,410,840
IMIDAZOLE DISAZO DYES
Hans Baumann and Johannes Dehnert, Ludwigshafen (Rhine), Germany, assignors to Badische Anilin- & Soda-Fabrik Aktiengesellschaft, Ludwigshafen (Rhine), Germany
No Drawing. Filed Apr. 16, 1965, Ser. No. 448,858
Claims priority, application Germany, Apr. 22, 1964, B 76,444
6 Claims. (Cl. 260—146)

ABSTRACT OF THE DISCLOSURE

Methoxy-substituted imidazole disazo dyes in which a quaternized imidazole is connected by an azo bridge to a phenyl- or naphthyl-azobenzene, said dyes providing unitary, lightfast brown shades when applied to polyacrylonitrile.

---

This invention relates to brown disazo dyes which bear methoxy groups as substituents and which contain a quaternized imidazolyl radical.

Monoazo and disazo dyes are already known which contain a quaternized imidazolyl radical. Such monoazo dyes of the prior art which contain only methoxy groups as auxochromic radicals are not suitable in practice as dyes for dyeing textile materials because they have inadequate color strength and relatively poor light fastness. They are however valuable intermediates for example for the production of basic monoazo dyes containing amino groups by the process of U.S. Patent Specification No. 3,102,879. Disazo dyes are also already known which contain a quaternized imidazole radical and which have a dialkylamino radical in p-position to the azo group. These dyes have a blue to violet color.

It is the object of this invention to prepare brown disazo dyes having a quaternized imidazolyl radical.

Brown shades are usually produced on polyacrylonitrile fibers by using a mixture of two or more dyes. These mixtures have the disadvantage that the dye components contained therein are often absorbed at different rates by the fiber and consequently the ratio of the components in the dye liquor may change. Thus, in some cases a considerable difference in shade is obtained at the beginning and end of the dyeing process. It is therefore desirable to use a unitary dye for brown dyeings because the said difficulty would not then arise.

The object of this invention, namely to obtain brown dyes for dyeing polyacrylonitrile which are not only unitary but also superior to prior art disazo dyes having an imidazolyl radical as regards light fasteness, fastness to decatizing, fastness to dry-heat pleating and retting and/or color strength, is achieved with dyes having the formula:

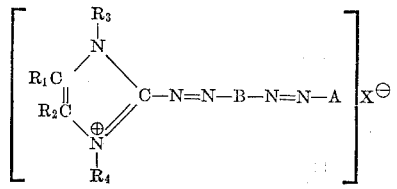

where $R_1$ denotes hydrogen or phenyl, $R_2$ denotes hydrogen or phenyl, $R_3$ denotes methyl or ethyl, $R_4$ denotes methyl or ethyl, A denotes phenyl, 4-methoxyphenyl, 2-methoxyl-5-chlorophenyl, 2,5-dimethoxyl-4-chlorophenyl, 2,4-dimethoxy-5-chlorophenyl or 4-nitrophenyl, B denotes 2-methylphenylene-(1,4), 2-methyl-5-methoxyphenylene-(1,4), 2,5-dimethoxyphenylene-(1,4), 2,5-dimethylphenylene-(1,4) or naphthylene-(1,4), and X denotes a colorless anion, said dyes containing at least one methoxy group.

The new dyes are obtained when diazo compounds of amines having the formula:

$$A-N=N-B-NH_2 \quad \text{II}$$

in which A and B having the above meanings are coupled with imidazole or 4,5-diphenylimidazole and the coupling products are treated with alkylating agents.

The aminoazo compounds II used for further diazotization are obtained by conventional methods by coupling diazo compounds of amines $A-NH_2$ with amines $B-NH_2$ which are not substituted in p-position.

Examples of the diazo components $A-NH_2$ are:

(a) 4-methoxyaniline and 4-chloro-2,5-dimethoxyaniline;
(b) aniline.

Examples of coupling components $B-NH_2$ are:

(c) coupling components for the diazo compounds of group (a) or (b): 3 methoxyaniline, 2,5-dimethoxyaniline and 2-methoxy-5-methylaniline;
(d) coupling components for the diazo compounds of group (a): 3-methylaniline, 2,5-dimethylaniline and 1-aminonaphthalene.

Unsubstituted imidazole and 4,5-diphenylimidazole are particularly suitable as coupling components.

Coupling of the diazotized aminoazo compounds having the Formula II with imidazole or its derivatives is preferably effected in an aqueous alkaline medium. Diphenylimidazole, which is a sparingly soluble imidazole derivative, is brought into a suitable state of fine division in water by first dissolving it in organic solvents and/or by using dispersing agents. It is preferable to use hydroxides of the alkali metals or alkaline earth metals or alkali metal carbonates as alkalies.

Under the stated coupling conditions, the disazo compounds are formed as anhydro bases having the formula:

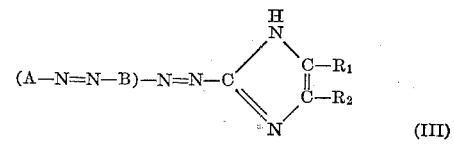

in which A, B, $R_1$ and $R_2$ have the above meanings.

These compounds are insoluble in water and are suitable for dyeing, from aqueous suspension, lacquers, organic solvents and semisynthetic or synthetic materials, particularly polyamide, polyester, polyacrylonitrile or cellulose acetate fibers. The said materials may also be mass-dyed or dyed by printing or impregnation followed by thermal fixation.

Protonized dye salts having the Formula I, in which $R_3$ and $R_4$ denote hydrogen, are obtained from the coupling products with mineral acids, but they are readily hydrolyzed again in water and therefore exhibit only slight solubility in water. Dye salts which have good solubility are obtained however by alkylation of the coupling components. Examples of alkylating agents are alkyl halides, such as methyl chloride, ethyl chloride, dialkyl sulfates or alkyl esters of aromatic sulfonic acids, such as diethyl sulfate or methyl benzenesulfonate and preferably dimethyl sulfate.

The alkylation is advantageously carried out in aqueous suspension or in organic solvents at room or elevated temperature. It is advantageous to work in the presence of acid-binding agents, such as alkali metal hydroxides, alkaline earth metal oxides, hydroxides or carbonates.

The dye quaternary salts obtained by alkylation are freed from organic solvent by filtration, distillation or dilution with water. They are isolated from aqueous solution by salting out and/or by adding suitable acids or metal salts. The quaternary dye salts, just like the coupling products, are suitable for dyeing synthetic materials. Textile materials of polyacrylonitrile or of copolymers containing acrylonitrile in particular are dyed full shades which are very light fast and wet fast.

The basic azo dyes obtained by alkylation may contain any colorless anion of a simple or complex inorganic or organic acid. The following may be given as examples of anions, which may also be subsequently introduced by double decomposition: $Cl^{\ominus}$, $Br^{\ominus}$, $I^{\ominus}$, $SO_4^{\ominus\ominus}$, $PO_4^{\ominus\ominus\ominus}$, $BF_4^{\ominus}$, $CH_3COO^{\ominus}$, $CH_3SO_4^{\ominus}$, $C_2H_5SO_4^{\ominus}$, $C_7H_7SO_3^{\ominus}$, $ZnCl_4^{\ominus\ominus}$ and $ZnBr_4^{\ominus\ominus}$.

The invention is further illustrated by the following examples. The parts and percentages specified in the examples are by weight. Parts by volume bear the same relation to parts by weight as the liter (STP) to the kilogram.

Example 1

96 parts of 2-methyl-4'-methoxy-4-aminoazobenzene with an addition of 320 parts of 5 N hydrochloric acid is ground in a ball mill and then stirred with 4000 parts of water at room temperature. A solution of 30 parts of sodium nitrite is gradually added and the mixture is stirred for several hours until the diazotization is completed. The filtered diazo solution, after the excess of sodium nitrite has been removed, is united with a solution of 34 parts of imidazole in 300 parts of water and then a solution of 56 parts of sodium hydroxide in 80 parts of water is allowed to flow in slowly during the course of one hour.

When coupling is over, the product is suction filtered, the filter residue washed with water and dried at 60° C. under subatmospheric pressure. 32 parts of the powdered coupling product is stirred with 400 parts of chloroform, 4 parts of magnesium oxide is added thereto and while stirring at 50° C., 28 parts of dimethyl sulfate is added slowly during the course of twenty minutes. The whole is stirred for five hours at boiling temperature and cooled. 550 parts of benzene is added and the product is suction filtered. The dried reaction product is dissolved in 1000 parts of water with 10 parts of 10-normal hydrochloric acid. The small amount of residue is filtered off, the dye is salted out with 200 parts of sodium chloride, suction filtered and dried. The dye obtained, which has the formula:

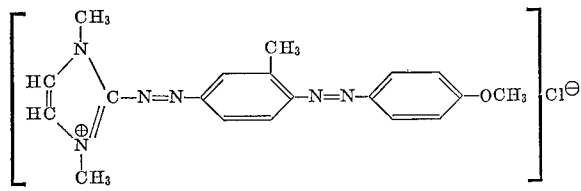

dyes polyacrylonitrile cloth from an acetic acid or sulfuric acid liquor in full yellowish brown shades which have very good light fastness, wash fastness and decatizing fastness.

When diethyl sulfate is used instead of dimethyl sulfate, an ethylated dye having similar properties is obtained.

Example 2

A solution of 31 parts of imidazole in 100 parts of water is allowed to flow into the filtered solution of the diazonium salt obtained from 96 parts of 5-methoxy-2-methyl-4-aminoazobenzene by the method described in Example 1 and then 65 parts by volume of 50% caustic soda solution is allowed to flow in gradually. The coupling product obtained is suction filtered and washed with water. The dried dye is a brown powder which dissolves in dimethylformamide with a brown yellow color and dyes polyamide cloth fast yellow brown shades.

Example 3

32 parts of the dye obtained according to Example 2 is stirred in 500 parts by volume of chloroform with an addition of 5 parts of magnesium oxide and 25 parts by volume of dimethyl sulfate for some hours at 50° to 60° C. until the reaction is completed. This may easily be determined by paper chromatography. 750 parts of water and 50 parts by volume of 30% acetic acid is then added, the chloroform is distilled off with steam and the dye is precipitated from the hot filtered solution by adding 500 parts by volume of saturated sodium chloride solution. The mixture is cooled and the dye salt having the formula:

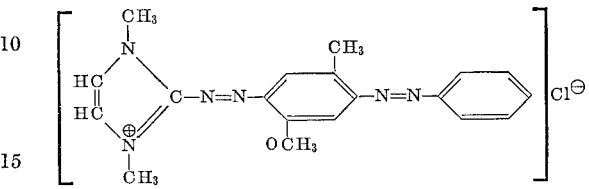

is suction filtered, washed with a little water and dried. A red brown powder is obtained which dissolves in hot water with a yellow brown color and dyes polyacrylonitrile cloth brown orange shades having very good light fastness and wet fastness.

Example 4

A solution of 31 parts of imidazole in 100 parts of water is first added and then 65 parts by volume of 50% caustic soda solution is gradually added as described in Example 2 to the diazo solution obtained from 103 parts of 2,5-dimethoxy-4-aminoazobenzene. The disazo dye is isolated and dried. It is a brown powder which dissolves in 80% acetone with a yellow brown color and dyes polyamide fibers fast brown red shades. Brown dyeings having very good wet fastness are obtained on polyester cloth at 130° C.

When the 4'-chloro-2,5-dimethoxy-4-aminoazobenzene is used as diazo component, a dye having similar properties is obtained.

Example 5

33 parts of the dye obtained according to the first paragraph in Example 4 is methylated as described in Example 3. The dye having the formula:

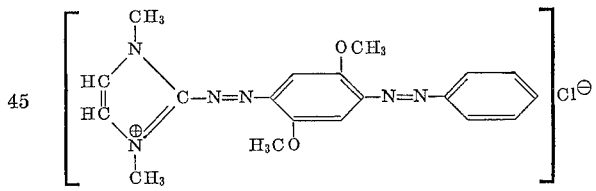

is obtained as a dark brown powder which dissolves in water with a brown red color and gives brown red dyeings having very good wet fastness and light fastness on polyacrylonitrile cloth.

By methylating the coupling product containing chlorine obtained according to paragraph 2 of Example 4, a dye is obtained which is similar in shade of color and tinctorial behavior to the methylation product free from chlorine.

Example 6

103 parts of 2,5-dimethoxy-4-aminoazobenzene is diazotized as described in Example 1. The filtered diazo solution is added slowly at 0° to 5° C. to a solution of 96 parts of 4,5-diphenylimidazole in 4000 parts by volume of N-methylpyrrolidone and then 80 parts by volume of 50% caustic soda solution is allowed to flow in. After coupling is over, the dye formed is precipitated by adding 25 parts by volume of 30% acetic acid, filtered by suction and washed with 60% alcohol.

The dried product is a dark brown powder which dissolves in dimethyl formamide with a violet color and dyes polyamide fibers fast violet brown shades.

Example 7

24 parts of the dye obtained according to Example 6 is stirred in 500 parts by volume of chloroform with 15 parts by volume of dimethyl sulfate and 3 parts of magnesium oxide for four hours at 50° to 60° C. 1000 parts of water and 50 parts by volume of 30% acetic acid is added and the chloroform is then distilled off. The dye having the formula:

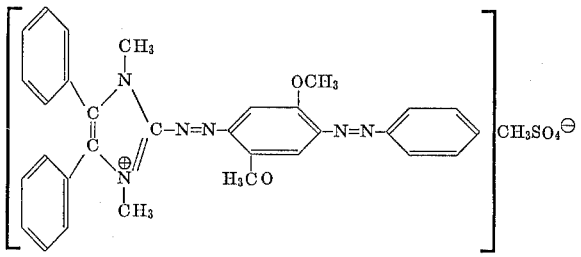

which crystallizes out upon cooling is suction filtered, washed with a little water and dried at 80° C. It dissolves in hot water with a brown violet color and dyes polyacylonitrile cloth current shades having very good light fastness and wet fastness.

Example 8

111 parts of 2'-methoxy-5'-chloro-2-methyl-4-aminoazobenzene is ground with 160 parts by volume of 10-normal hydrochloric acid and the mixture is allowed to stand for several hours. 600 parts of water and 600 parts of ice are added, followed by 120 parts by volume of 23% sodium nitrite solution and the whole is stirred for two hours. 31 parts of imidazole dissolved in water is gradually added to the resultant diazotization mixture, followed by 80 parts by volume of 50% caustic soda solution.

35 parts of the isolated and dried coupling product is stirred with a mixture of 500 parts by volume of chloroform, 30 parts by volume of dimethyl sulfate and 6 parts of magnesium oxide for five hours while boiling under reflux. After the product has cooled, it is suction filtered. The filter cake is washed with a little chloroform and dried. It is dissolved hot in a mixture of 1500 parts of water and 30 parts by volume of 30% acetic acid. The dye is precipitated as the zinc chloride double salt having the formula:

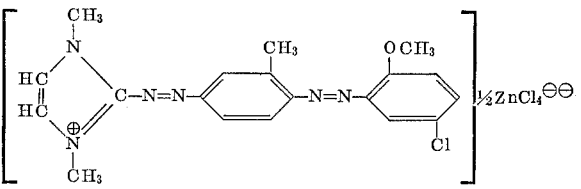

by adding 50 parts by volume of 50% zinc chloride solution and 250 parts by volume of saturated sodium chloride solution; the double salt is then suction filtered and washed with a little water.

The powder obtained after the product has been dried dissolves in hot water with a yellow color and gives, on polyacrylonitrile threads, brown yellow dyeings having very good light fastness and wet fastness.

By using 122 parts of 2',4'-dimethoxy-5'-chloro-2-methyl-4-aminoazobenzene as the diazo component, a brown methylation product having similar tinctorial properties is obtained.

By using diethyl sulfate as alkylating agent instead of dimethyl sulfate, a dye having similar properties is obtained.

Example 9

40 parts of the dry coupling product (obtained from 2',5'-dimethoxy-4'-chloro-2,5-dimethyl - 4 - aminoazobenzene and imidazole by the method of Example 8) is stirred in 500 parts by volume of chloroform with an addition of 30 parts by volume of dimethyl sulfate and 6 parts of magnesium oxide for five hours while boiling under reflux. 4000 parts of water and 50 parts by volume of 30% acetic acid is then added and the whole is filtered while hot. The dye is precipitated from the filtrate by adding 25 parts by volume of 50% zinc chloride and 200 parts of sodium chloride; the precipitate is the tetrachlorozincate having the formula:

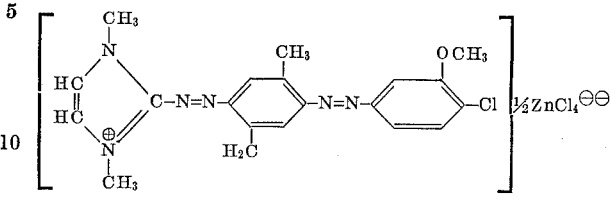

The product is isolated and dried. It is a brown powder which dissolves in hot water with a brown color and dyes polyacrylonitrile brown shades having very good light fastness and wet fastness.

The dyes in the following table are obtained in an analogous way and exhibit similar properties:

| Formula of the dye cation | Anion | Shade of dyeing on polyacrylonitrile |
|---|---|---|
| Cl—⟨⟩—N=N—⟨CH₃⟩—N=N—⟨N-CH₃⟩ OCH₃  CH₃  ⊕N-CH₃ | Cl⊖ | Yellow brown. |
| CH₃O—⟨Cl⟩—N=N—⟨CH₃⟩—N=N—⟨N-CH₃⟩ OCH₃  CH₃  ⊕N-CH₃ | Br⊖ | Brown. |
| Cl—⟨⟩—N=N—⟨CH₃⟩—N=N—⟨N-CH₃⟩ OCH₃  OCH₃  ⊕N-CH₃ | BF₄⊖ | Red brown. |

Example 10

2.4 - dimethoxy - 5 - chlorobenzeneazo - 4 - aminonaphthalene-(1) is diazotized and coupled with imidazole as described in Example 8. 20 parts of the dye thus obtained is stirred in 500 parts by volume of chloroform with an addition of 15 parts by volume of dimethyl sulfate and 3 parts of magnesium oxide at 50° to 60° C. until initial material can no longer be detected by paper chromatography. The whole is cooled and the crude product is suction filtered and dried. It is then stirred with a mixture of 50 parts of water and 10 parts of 30% acetic acid, suction filtered and washed with a little water. The dried dark brown dye having the formula:

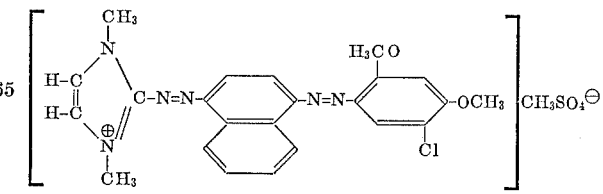

dissolves in hot water with a brown violet color and dyes polyacrylonitrile cloth fast currant shades.

Dyes having similar properties are obtained by using 2,4 - dimethoxybenzeneazo - 4 - aminonaphthalene - (1) or 2-methoxy-5-chlorobenzeneazo-4-aminonaphthalene-(1).

Example 11

8 parts of the coupling product of 4'-nitro-5-methoxy-2-methyl-4-aminoazobenzene and imidazole is stirred in a mixture of 150 parts by volume of chloroform, 7.5 parts by volume of dimethyl sulfate and 1.5 parts of magnesium oxide for five hours while boiling under reflux. 4000 parts of water and 30 parts by volume of 30% acetic acid are added and the chloroform is distilled off and the aqueous dye solution is filtered while hot. The dye obtained, which has the formula:

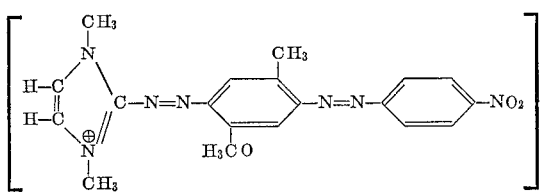

has a viscous schlieric consistency and can hardly be filtered in this form. The whole is therefore diluted to 30,000 parts by volume with water and 300 parts of sodium chloride is added thereto at 90° to 100° C. The mixture is cooled and the product is suction filtered and dried at 80° C. The brown powder thus obtained dissolves in a large amount of hot water with a yellow brown color and gives brown dyeings having very good fastness on polyacrylonitrile fibers.

We claim:
1. A dye having the formula:

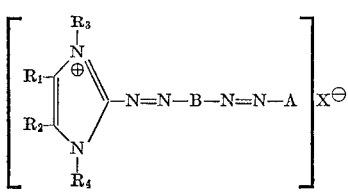

where
 $R_1$ and $R_2$ each denote a member selected from the class consisting of hydrogen and phenyl,
 $R_3$ and $R_4$ each denote a member selected from the class consisting of methyl and ethyl,
 A denotes a member selected from the class consisting of phenyl, 4-methoxyphenyl, 2-methoxy-5-chlorophenyl, 2,5-dimethoxyl-4-chlorophenyl, 2,4-dimethoxy-5-chlorophenyl and 4-nitrophenyl,
 B denotes a member selected from the class consisting of 2-methylphenylene-(1,4), 2-methyl-5-methoxyphenylene-(1,4), 2,5-dimethoryphenylene-(1,4), 2,5-dimethylphenylene-(1,4) and naphthylene-(1,4), and
 $X^\ominus$ denotes a colorless anion, with the proviso that said members A and B when taken together are selected so as to contain from 1 to 4 methoxy groups.

2. The dye having the formula:

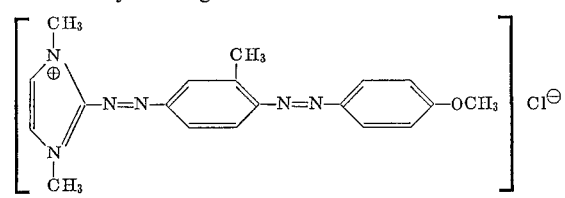

3. The dye having the formula:

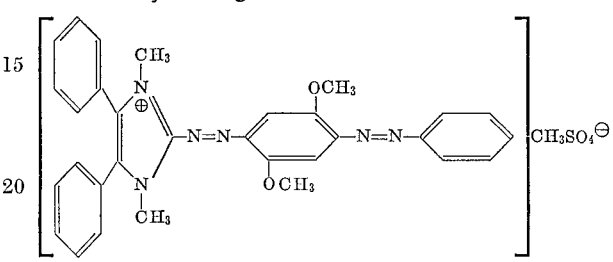

4. The dye having the formula:

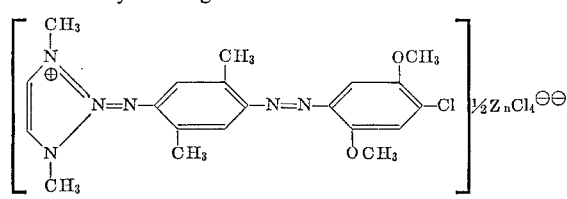

5. The dye having the formula:

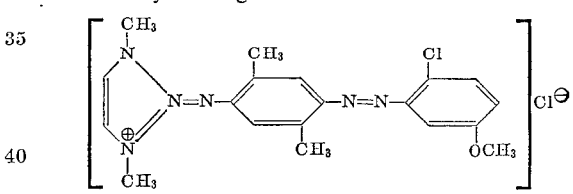

6. The dye having the formula:

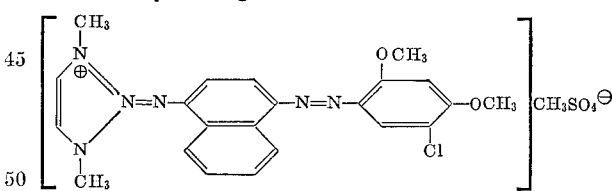

References Cited
UNITED STATES PATENTS
3,133,910  5/1964  Baumann et al. _____ 26—157

CHARLES B. PARKER, *Primary Examiner.*
D. M. PAPUGA, *Assistant Examiner.*

UNITED STATES PATENT OFFICE
CERTIFICATE OF CORRECTION

Patent No. 3,410,840                November 12, 1968

Hans Baumann et al.

It is certified that error appears in the above identified patent and that said Letters Patent are hereby corrected as shown below:

Column 1, line 52, "fasteness" should read -- fastness --. Column 6, lines 5 to 13, the formula should appear as shown below:

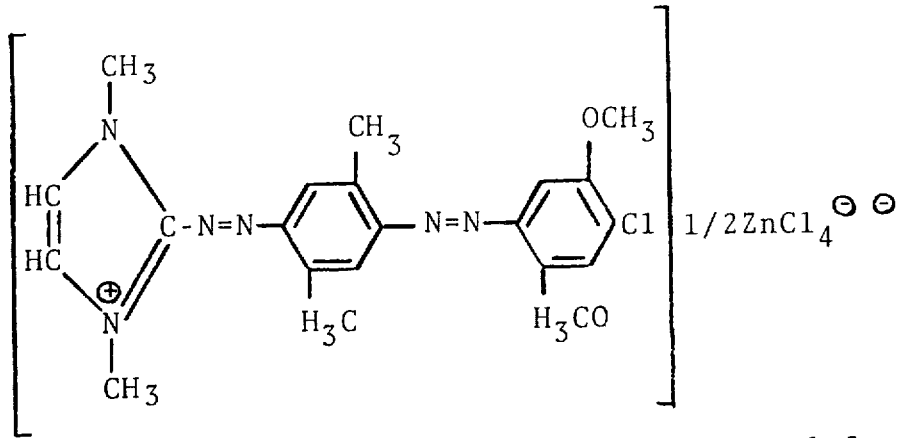

same column 6, in the table, that portion of the third formula reading

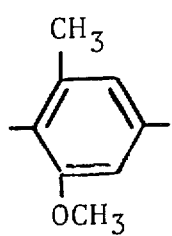      should read      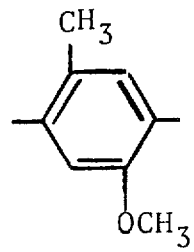

Column 7, line 55, "dimethoryphenylene" should read -- dimethoxyphenylene --.

Signed and sealed this 21st day of April 1970.

(SEAL)
Attest:

EDWARD M. FLETCHER, JR.
Attesting Officer

WILLIAM E. SCHUYLER, JR.
Commissioner of Patents